US011047955B2

(12) United States Patent
Abari et al.

(10) Patent No.: US 11,047,955 B2
(45) Date of Patent: Jun. 29, 2021

(54) CALIBRATING A RADAR ANTENNA

(71) Applicant: Lyft, Inc., San Francisco, CA (US)

(72) Inventors: Farzad Cyrus Foroughi Abari, San Bruno, CA (US); Romain Clément, Campbell, CA (US); Mayur Nitinbhai Shah, Pleasanton, CA (US)

(73) Assignee: Lyft, Inc., San Francisco, CA (US)

( * ) Notice: Subject to any disclaimer, the term of this patent is extended or adjusted under 35 U.S.C. 154(b) by 280 days.

(21) Appl. No.: 16/029,473

(22) Filed: Jul. 6, 2018

(65) Prior Publication Data
US 2020/0011970 A1 Jan. 9, 2020

(51) Int. Cl.
G01S 7/40 (2006.01)

(52) U.S. Cl.
CPC ....... G01S 7/4026 (2013.01); *G01S 2007/403* (2013.01)

(58) Field of Classification Search
CPC .................. G01S 7/4026; G01S 2007/403
USPC ......................................................... 342/174
See application file for complete search history.

(56) References Cited

U.S. PATENT DOCUMENTS

| | | | | |
|---|---|---|---|---|
| 4,488,041 A * | 12/1984 | Baudot | ............ | G01C 19/28 250/231.12 |
| 4,488,081 A * | 12/1984 | Kondo | ............ | H01T 13/39 313/141 |
| 4,694,298 A * | 9/1987 | Milan | ............ | G01S 13/53 342/162 |
| 5,777,573 A * | 7/1998 | Klausing | ............ | G01S 13/9019 342/25 F |
| 5,977,906 A * | 11/1999 | Ameen | ............ | G01S 13/931 342/174 |
| 6,816,267 B2 * | 11/2004 | Evans | ............ | G01B 21/042 356/512 |
| 6,914,949 B2 * | 7/2005 | Richards | ............ | H04B 1/719 370/230 |
| 9,348,017 B2 * | 5/2016 | Steinlechner | ......... | G01S 7/4026 |
| 9,523,769 B2 * | 12/2016 | Park | ............ | G01S 7/4052 |
| 9,823,337 B2 * | 11/2017 | Heo | ............ | G01S 7/4026 |
| 10,578,713 B2 * | 3/2020 | Yomo | ............ | G01S 13/931 |

(Continued)

FOREIGN PATENT DOCUMENTS

RU    2303796 C1 *  7/2007

OTHER PUBLICATIONS

Daniel De Zutter "Scattering by a Rotating Dielectric Sphere" in IEEE Transactions on Antennas and Propagation, vol. AP-28, No. 5, Sep. 1980 (Year: 1980).*

(Continued)

*Primary Examiner* — Vladimir Magloire
*Assistant Examiner* — Alexander L. Syrkin
(74) *Attorney, Agent, or Firm* — Baker Botts L.L.P.

(57) ABSTRACT

In one embodiment, a method includes causing a radar antenna to transmit a plurality of radar signals at a plurality of sweep angles and, for each of one or more the radar signals reflected back to the radar antenna, calculating a radial-velocity component. The method also includes identifying one of the radial-velocity components, identifying one of the plurality of sweep angles corresponding to the identified radial-velocity components, and calculating an offset of an electrical boresight of the radar antenna based at least in part on the identified sweep angle corresponding to the identified radial-velocity component.

23 Claims, 9 Drawing Sheets

(56) References Cited

U.S. PATENT DOCUMENTS

| | | | |
|---|---|---|---|
| 10,605,896 B2* | 3/2020 | Cao | G01S 13/931 |
| 10,625,735 B2* | 4/2020 | Matsunaga | B60W 30/085 |
| 2006/0066475 A1* | 3/2006 | Tullsson | G01S 7/4026 |
| | | | 342/159 |
| 2018/0118201 A1* | 5/2018 | Matsunaga | B60W 30/085 |
| 2019/0025405 A1* | 1/2019 | Liu | G01S 13/584 |
| 2019/0219706 A1* | 7/2019 | Wang | H01Q 3/02 |
| 2020/0326411 A1* | 10/2020 | Zhou | G01S 13/52 |

OTHER PUBLICATIONS

Ayoub Soltane, Guillaume Andrieu, Alain Reineix "Analytical Model for the Assessment of Doppler Spectrum of Rotating Objects" in Proc. of the 2017 International Symposium on Electromagnetic Compatibility—EMC Europe 2017, Angers, France, Sep. 4-8, 2017 (Year: 2017).*

* cited by examiner

CALIBRATING A RADAR ANTENNA

BACKGROUND

A vehicle (such as an autonomous vehicle) for transporting humans or goods may be equipped with a radar system used to determine the locations and shapes of objects near the vehicle. The radar system may include one more radar antennas. A radar antenna has an electrical boresight that is the axis of maximum gain (or maximum radiated power) of the radar antenna, and the radiation pattern of the radar antenna may be symmetrical about its electrical boresight. If the radar antenna is properly calibrated, then its expected electrical boresight will be aligned with its actual electrical boresight. The expected electrical boresight of the radar antenna is the electrical boresight that the radar system expects the radar antenna to have, and the actual electrical boresight of the radar antenna is the electrical boresight that the radar antenna actually has. If the radar antenna is not properly calibrated, then its expected electrical boresight may differ from its actual electrical boresight, which may make the radar system less accurate.

The orientation of the radar antenna may, at least in part, determine its electrical boresight. The orientation of a radar antenna on a vehicle may change over time, e.g., due to collisions, driving over potholes, or normal vibrations that occur when driving. As the orientation of the radar antenna changes, the actual electrical boresight of the radar antenna may deviate from its expected electrical boresight and the vehicle's radar system may become less accurate. To address this, the radar antenna may periodically be recalibrated. Traditional calibration methods involve placing the vehicle inside an anechoic chamber with a reflective trihedral in line with the expected electrical boresight of the radar antenna on the vehicle.

DESCRIPTION OF EXAMPLE EMBODIMENTS

Figure 1A:
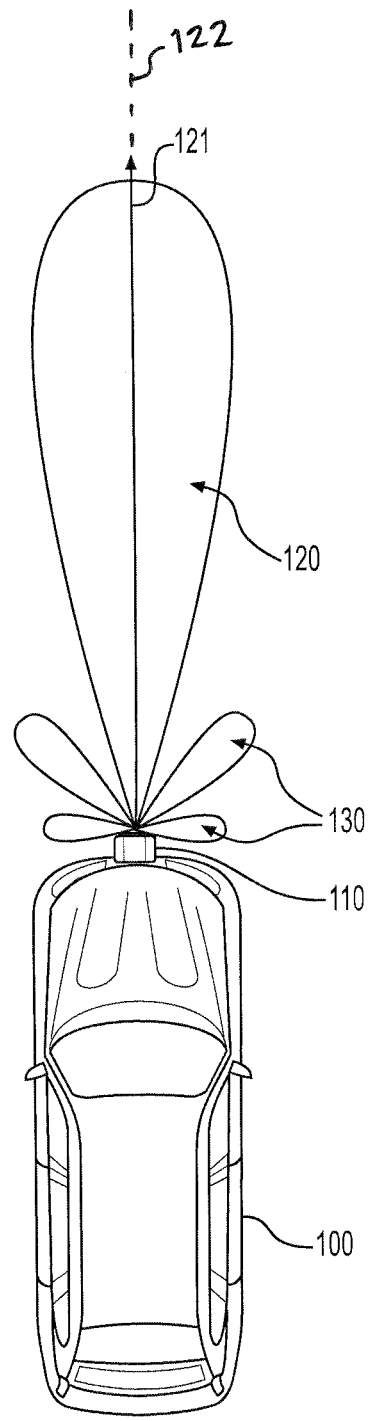
FIG. 1A illustrates an example vehicle with an example radar antenna that has an expected electrical boresight horizontally aligned with its actual electrical boresight.

In the following description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim or in any combination with any embodiment or feature described or depicted herein or with any of the features of the attached claims.

The electrical boresight of a radar antenna is the axis of maximum gain (or maximum radiated power) of the radar antenna, and the radiation pattern of the radar antenna may be symmetrical about its electrical boresight. Herein, reference to a radar antenna may encompass one or more devices for transmitting or receiving electromagnetic waves, where appropriate. For example, where appropriate, reference to a radar antenna may indicate a single device for transmitting electromagnetic waves; a single device for receiving electromagnetic waves; a single device for transmitting and receiving electromagnetic waves; a combination of multiple devices for transmitting electromagnetic waves; a combination of multiple devices for receiving electromagnetic waves; or a combination of multiple devices for receiving and electromagnetic waves. A radar antenna may be part of a radar system (such as an automotive imaging radar system), which may include which may include hardware, software, or both for controlling the radar antenna and for processing and analyzing output from the radar antenna. Reference herein to a radar antenna may encompass a radar system that the radar antenna is a part of, and vice versa, where appropriate.

Figure 2:
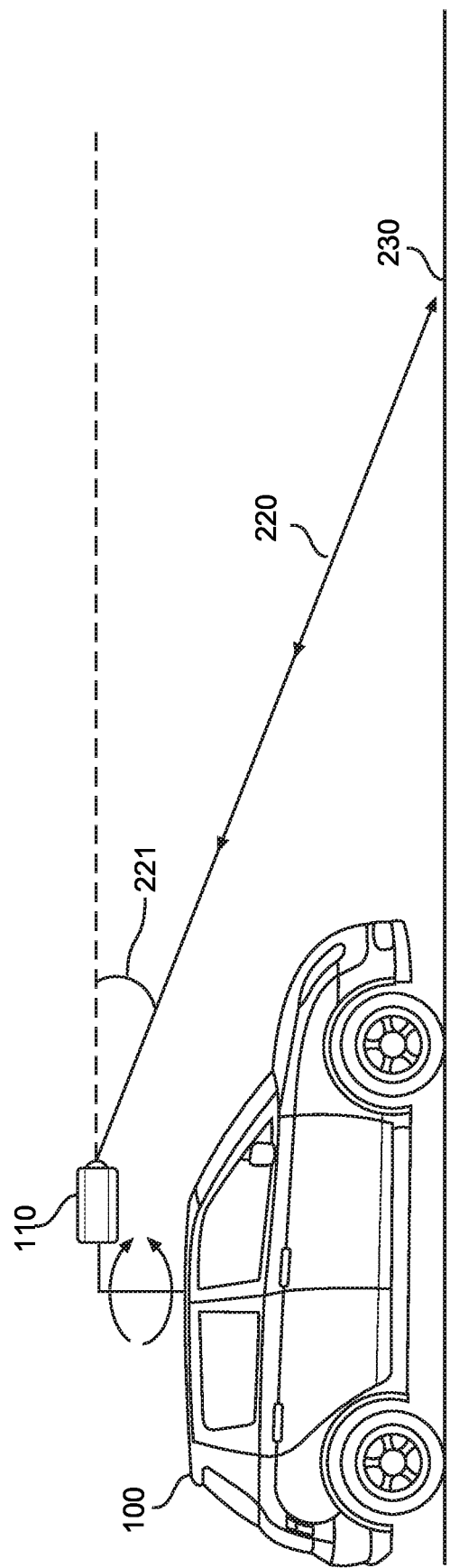
FIG. 2 illustrates an example system for calibrating a radar antenna on a vehicle in an open area.
Figure 3:
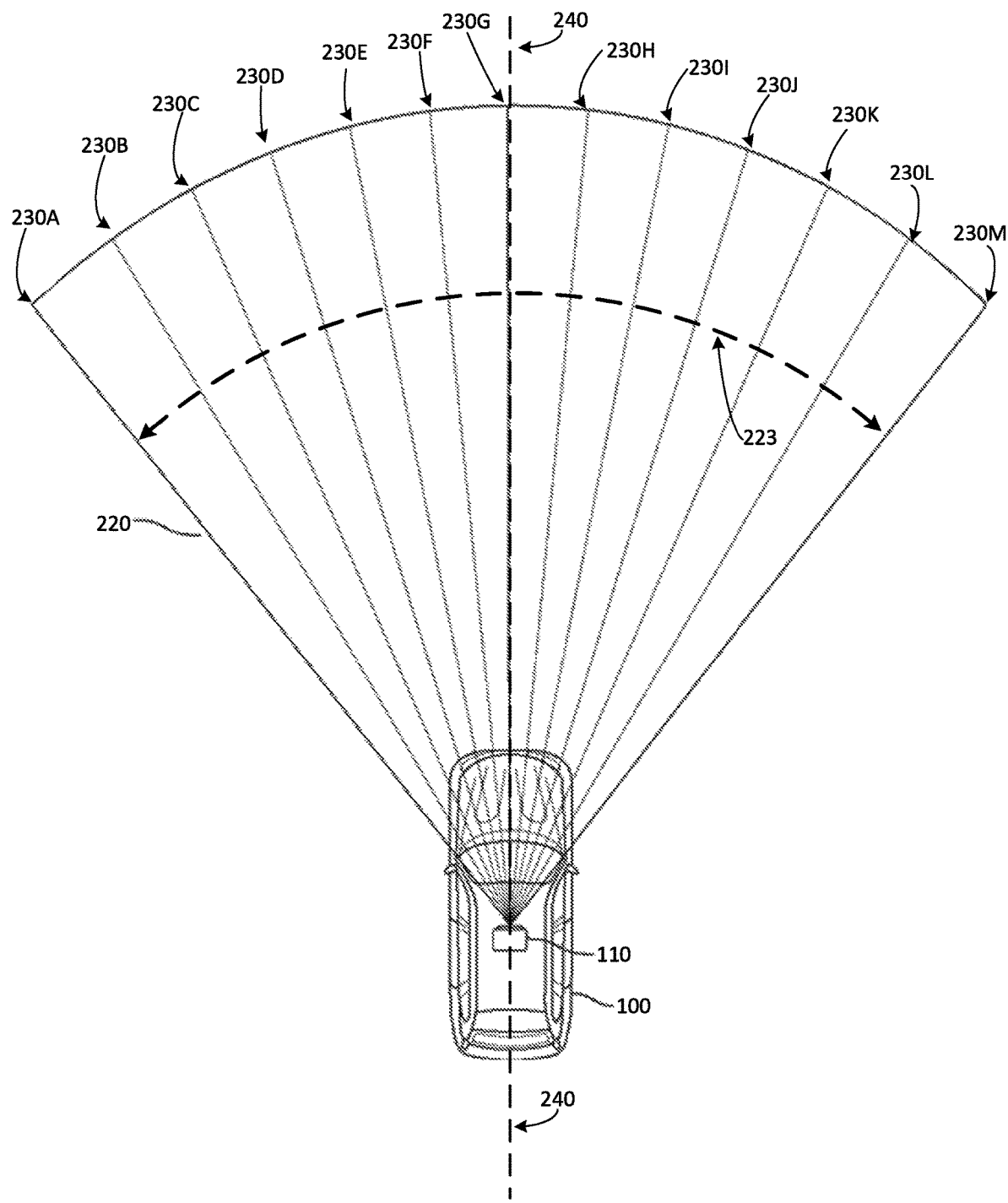
FIG. 3 illustrates the example system of FIG. 2 from a top-down view.
Figure 6:
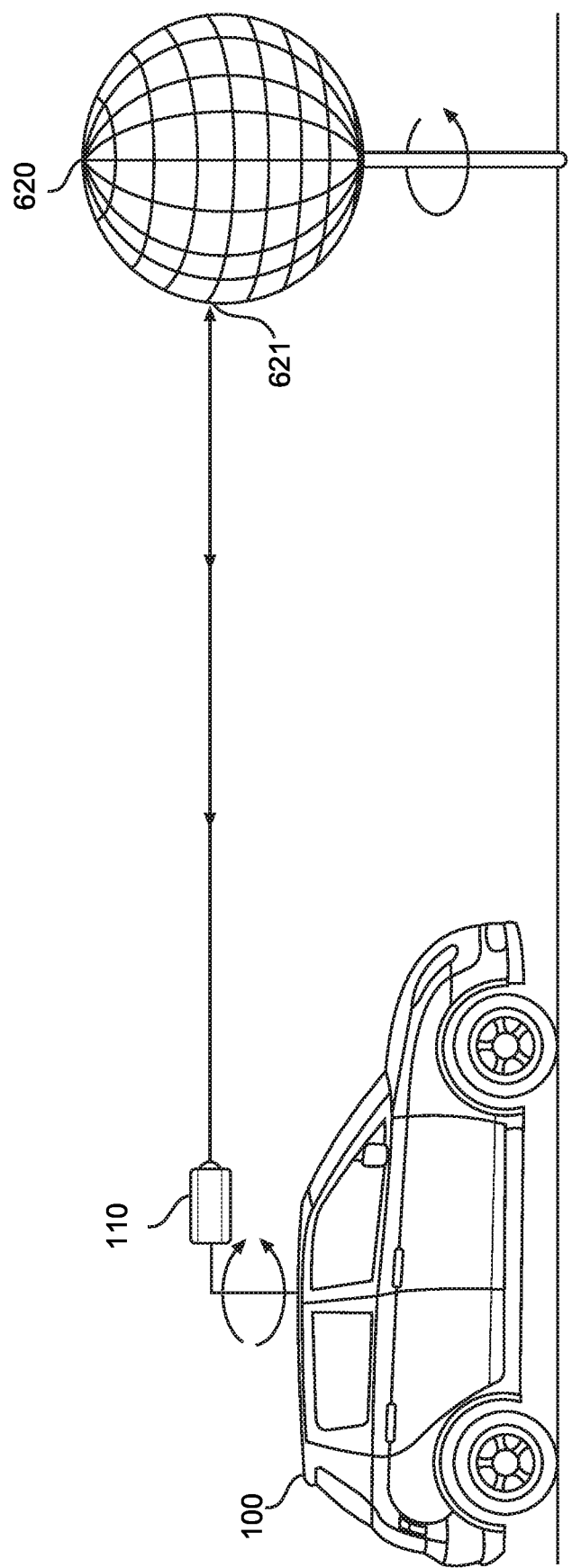
FIG. 6 illustrates another example system for calibrating a radar antenna on a vehicle using a rotating sphere.
Figure 7:
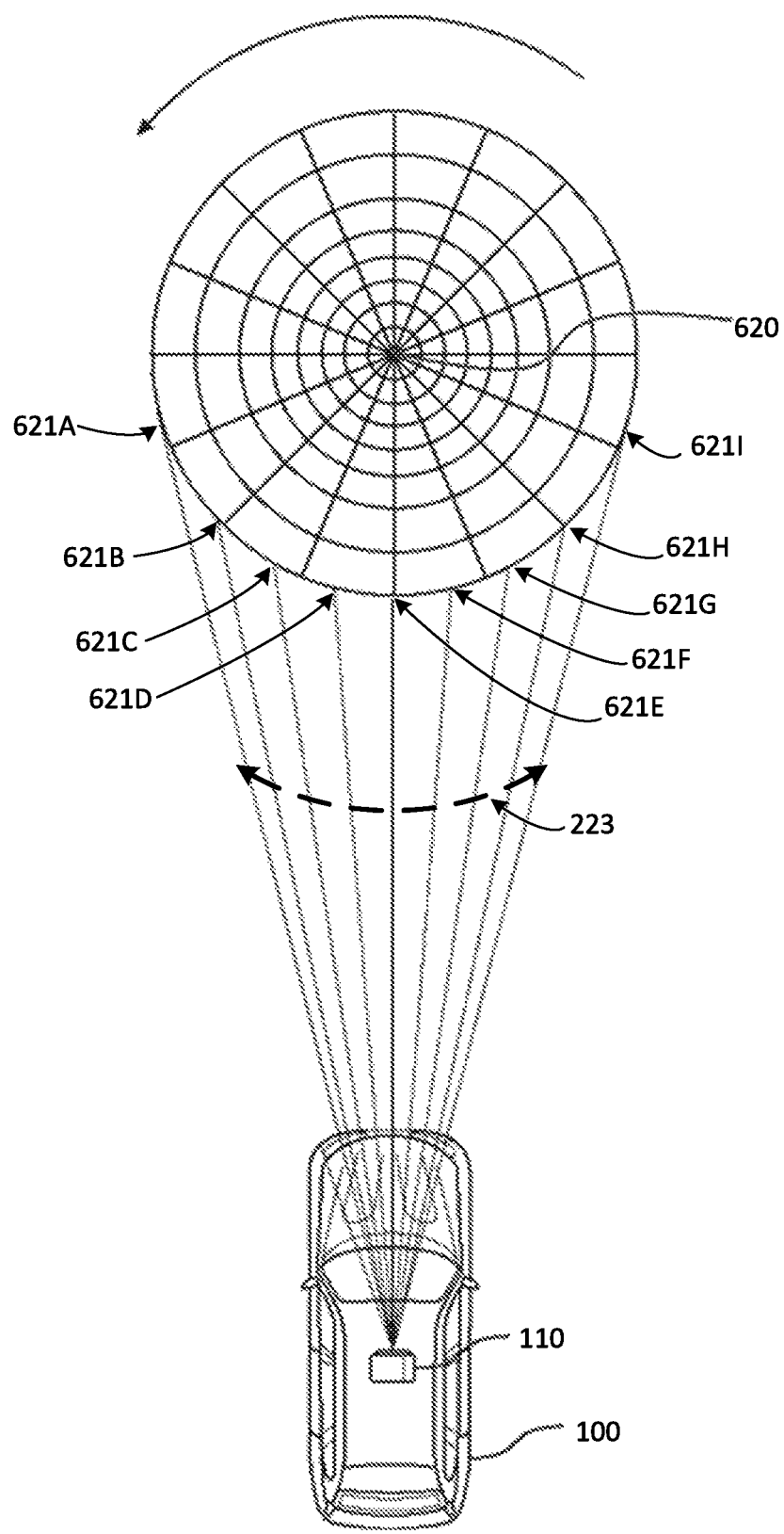
FIG. 7 illustrates the example system of FIG. 6 from a top-down view.

If the radar antenna is calibrated properly, the expected electrical boresight of the radar antenna will be aligned with the actual electrical boresight of the radar antenna. Traditional calibration methods involve placing the radar antenna inside an anechoic chamber with a reflective trihedral in line with the expected electrical boresight of the radar antenna. If the actual electrical boresight of the radar antenna is aligned with the expected electrical boresight of the radar antenna, then the trihedral will reflect the radar signal from radar antenna back to the radar antenna. On the other hand, if the actual electrical boresight is out of alignment with the expected electrical boresight, then little or none of the radar signal will be reflected back to the radar antenna. The orientation of the radar antenna may be changed or the radar signal from the radar antenna may otherwise be redirected until it is reflected back to the radar antenna by the trihedral, indicating that the actual and expected electrical boresights of the radar antenna are aligned with each other. In addition or as an alternative, the trihedral may be moved relative to the radar antenna until it reflects the radar signal back to the radar antenna. When the radar signal is reflected back to the radar antenna by the trihedral, the actual electrical boresight of the radar antenna may be recorded and its offset from the expected electrical boresight of the radar antenna calculated. The radar antenna may then be recalibrated. Traditional calibration methods are burdensome and expensive. In particular embodiments, to reduce the cost and time necessary to calibrate a radar antenna, a radar antenna may be calibrated using an open area or rotating sphere. FIGS. 2 and 3 illustrate example calibration using an open area. FIGS. 6 and 7 illustrate example calibration using a rotating sphere.

Figure 1B:
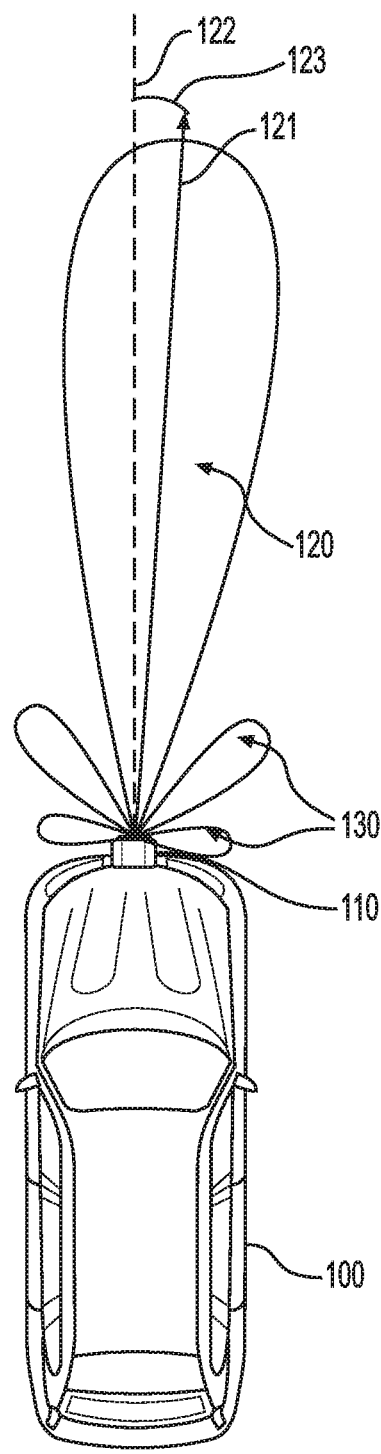
FIG. 1B illustrates an example vehicle with an example radar antenna that has an expected electrical boresight that differs horizontally from its actual electrical boresight.

FIG. 1A illustrates an example vehicle with an example radar antenna that has an expected electrical boresight horizontally aligned with its actual electrical boresight. In the example of FIG. 1A, vehicle 100 (which may in particular embodiments be an autonomous vehicle) is equipped with an automotive imaging radar system that includes radar antenna 110. Although radar antenna 110 is described and illustrated as being in front of vehicle 100, this disclosure contemplates radar antenna 110 (or one or more components of radar antenna 110) being on or in, or integrated into any suitable location on or in, vehicle 100. For example, one or more components of radar antenna 110 may be located on top of vehicle 100 (as illustrated in FIG. 2) or elsewhere in or on vehicle 100. Radar antenna 110 transmits a radar signal that has a main lobe 120 and side lobes 130. Main lobe 120 is split by actual electrical boresight 121 of radar antenna 110. Actual electrical boresight 121 is horizontally aligned with expected electrical boresight 122 of radar antenna 110. Thus, horizontal measurements by radar antenna 110 may be more accurate. By contrast, FIG. 1B illustrates an example vehicle with an example radar antenna that has an expected electrical boresight that differs horizontally from its actual electrical boresight. In the example of FIG. 1B, actual electrical boresight 121 is horizontally offset from expected electrical boresight 122 by offset 123. Offset 123 may have resulted from radar antenna 110 becoming damaged, moved, or otherwise affected by one or more collisions, driving on rough roads (e.g., driving over potholes), or through normal vibrations of vehicle 110 that occur when driving. As a result, horizontal measurements by radar antenna 110 in FIG. 1B may be less accurate. For example, if offset 123 is 5° to the right, a radar system of vehicle 110 may determine, based on measurements by radar antenna 110, that an object is located directly in front of vehicle 100 when in reality the object is located 5° to the right of a center line of the vehicle. Offset 123 may thus cause vehicle 100 to miscalculate the locations of objects. However, if the amount of offset 123 between actual electrical boresight 121 and expected electrical boresight 122 is known by the radar system of vehicle 100, the radar system may be able to correct for offset 123 when calculating the location of an object based on measurements by radar antenna 110. Particular embodiments facilitate the determination of the amount of this offset to enable the radar system to correct for it.

FIG. 2 illustrates an example system for calibrating a radar antenna 110 on a vehicle 100 in an open area. Although radar antenna 110 is described and illustrated as being on top of vehicle 100 in the example of FIG. 2, this disclosure contemplates radar antenna 110 (or one or more components of radar antenna 110) being on or in, or integrated into any suitable location on or in, vehicle 100. For example, one or more components of radar antenna 110 may be located on or in a front bumper of vehicle 100 (as illustrated in FIGS. 1A and 1B) or elsewhere in or on vehicle 100. In the example of FIG. 2, to calibrate radar antenna 110, vehicle 100 drives forward at a substantially constant velocity in a substantially straight line on a substantially flat surface while radar antenna 110 transmits radar signals 220 in front of vehicle 100 at a substantially constant elevation angle 4), indicated by reference number 221, through a sweep range 223 (illustrated in the top-down view of FIG. 3). During this process, radar signals 220 are reflected back to radar antenna 110 from locations 230, which collectively form a circular arc (also illustrated in the top-down-view of FIG. 3) in front of vehicle 100 on the surface that vehicle 100 is driving on. As an example and not by way of limitation, elevation angle 221 may be −5° and the radial distance between radar antenna 110 and locations 230 may be 20 meters. Elevation angle 221 may depend on the size of the open area available to vehicle 110 during the calibration process. For example, an elevation angle of −5° may be used in a larger open area and an elevation angle of −15° may be used in a smaller open area. In particular embodiments, a smaller elevation angle 221 may provide more accurate results. In particular embodiments, the radar system of vehicle 100 (or one or more other systems or components of vehicle 100) may be able to account for one or more changes in the velocity of vehicle 100, curves in the path driven by vehicle 100, unevenness in the surface that vehicle 100 is driving on, or changes in elevation angle 221 during the calibration process, so that vehicle 100 does not necessarily have to drive at a substantially constant velocity in a substantially straight line on a substantially flat surface. For example, if vehicle 100 does not drive in a substantially straight line, the orientation of vehicle 100 may be monitored with an inertial sensor or other suitable internal navigation system (INS) sensor and then accounted for (as described below).

Radar antenna 110 may transmit radar signals 220 at different sweep, or azimuth, angles $\theta$ through sweep range 223. The sweep angles $\theta$ may range from a negative value to a positive value, for example from −55° to +55°, with 0° being aligned with a central longitudinal 240 axis of vehicle 100 (illustrated in the top-down view of FIG. 3). Radar antenna 110 may transmit a radar signal 220 at every degree within the sweep range, e.g., $\theta_i$=−55°, −54°, −53°, . . . , +54°, +55°. Alternatively, radar antenna 110 may transmit a radar signal 220 at other predetermined intervals, such as every other degree, e.g., $\theta_i$=−55°, −53°, −51°, . . . , +53°, +55°, or any other suitable interval(s). Doppler shifts in radar signals 220 reflected back to radar antenna 110 from locations 230 may be measured by the radar system of vehicle 100 to determine the radial-velocity component $v_r$ of each location 230 relative to radar antenna 110 (which is moving forward with vehicle 100). If vehicle 100 is moving in a straight line at a speed of $v_0$ meters per second and radar antenna 110 is properly calibrated in elevation, then the radial-velocity component $v_r$ of a location 230 relative to radar antenna 110 will be $v_r(\theta_i,\phi)=v_0 \cos(\theta_i) \cos(\phi)$ for sweep angle $\theta_i$ corresponding to that location 230 and for elevation angle $\phi$. A cosine function may be fit to the resulting characteristic curve through sweep range 223 that an azimuthal beam offset 123, if any, may be calculated from, as described below with reference to FIGS. 4 and 5. In particular embodiments, this calibration process may last a relatively short duration of time, such as, for example, between 0.001 seconds and 0.5 seconds.

Figure 4:
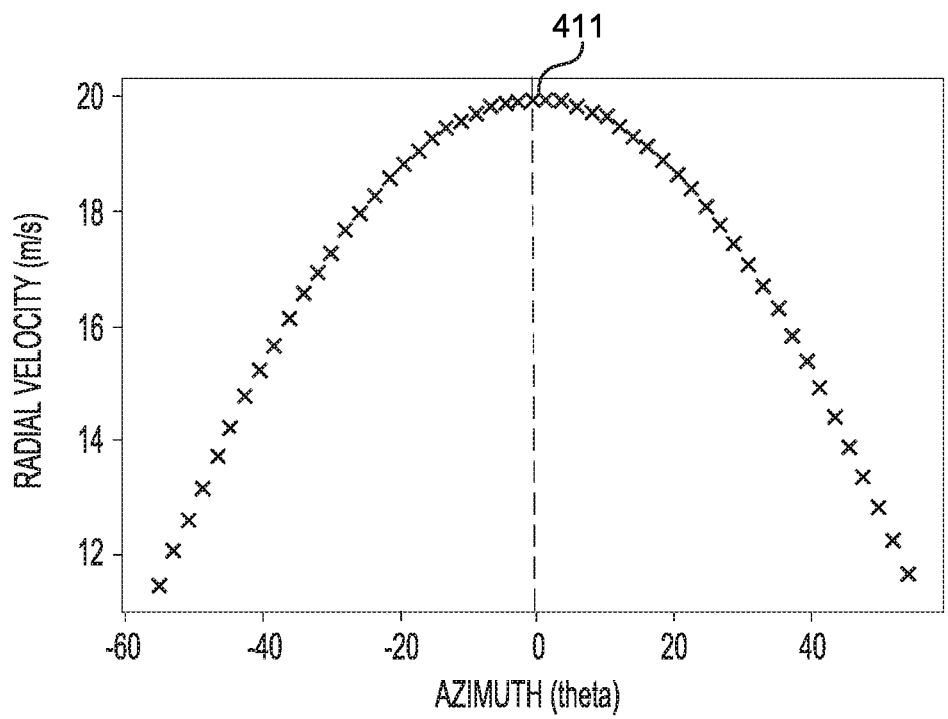
FIG. 4 illustrates an example characteristic curve of radial velocities observed by a radar antenna through a sweep range.
Figure 5:
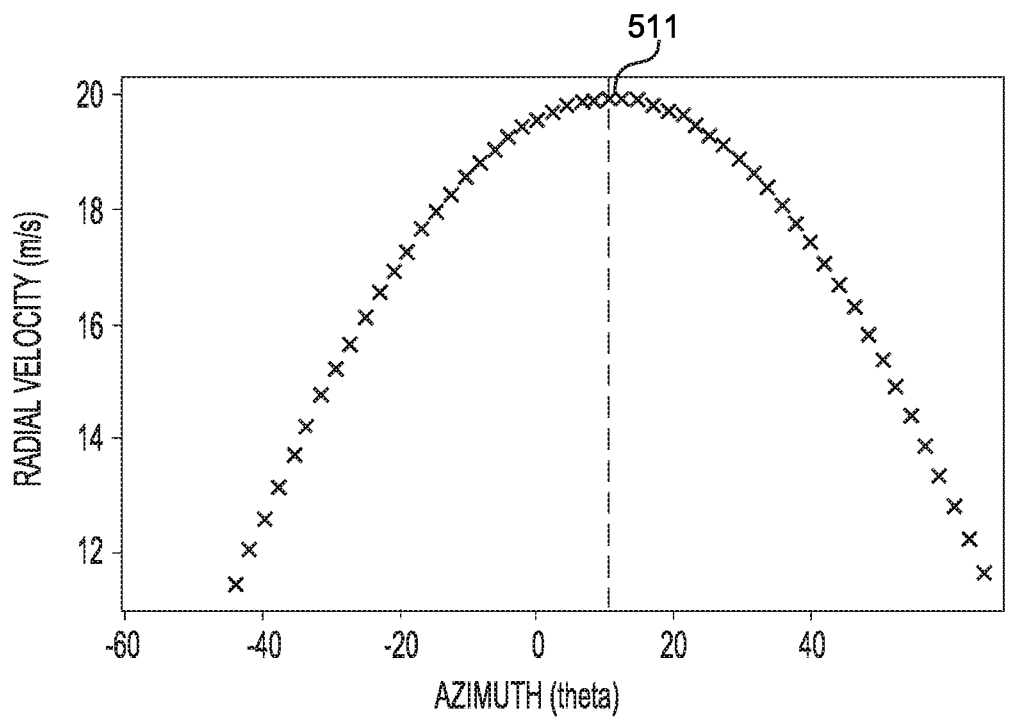
FIG. 5 illustrates another example characteristic curve of radial velocities observed by a radar antenna through a sweep range.

FIG. 3 illustrates the example calibration system of FIG. 2 from a top-down view. In the example of FIG. 3, sweep range 223 extends from location 230A to location 230M. Although FIG. 3 shows a particular number of particular locations 230, this disclosure contemplates any suitable number of any suitable locations. As an example and not by way of limitation, radar antenna may transmit radar signals 220 at 60 different sweep angles θ through sweep range 223 and radar signals 220 may be reflected back to radar antenna 110 from 60 different locations 230 on the ground. When the sweep angle θ is at the extreme positions (e.g. $\theta_i = -55°$ or +55°) and radar signals 220 are being reflected back to radar antenna 110 from leftmost and rightmost locations 230 (e.g. locations 230A and 230M), the radial-velocity component observed by radar antenna 110 will be at a minimum (e.g. cos±55°=0.57 and cos 0°=1). If the expected electrical boresight of radar antenna 110 is horizontally aligned with a central longitudinal axis 240 of vehicle 100 and radar antenna 110 is properly horizontally oriented, then the radial-velocity component observed by radar antenna 110 will be greatest at a sweep angle of 0° from central longitudinal axis 240 of vehicle 100. However, if radar antenna 110 is not properly horizontally oriented, then the radial-velocity component observed by radar antenna 110 will be greatest at a sweep angle other than 0° from central longitudinal axis 240 of vehicle 100. The sweep angle with the greatest radial-velocity component observed by radar antenna 110 may be determined by plotting the radial-velocity components observed by radar antenna 110 through sweep range 223 (as illustrated in FIGS. 4 and 5), which may indicate an offset 123 (if any) between the expected electrical boresight and the actual electrical boresight of radar antenna 110. Although this disclosure describes and illustrates determining particular offsets 123 between particular actual and expected electrical boresights, this disclosure contemplates determining any suitable offset 123 between any suitable actual and expected electrical boresights. Moreover, this disclosure contemplates determining any suitable number and types of offsets 123. For example, in particular embodiments, in addition or as an alternative to a horizontal offset 123 between the actual and expected electrical boresights of a radar antenna 110 being determined, a vertical offset 123 between the actual and expected electrical boresights of radar antenna 110 may be determined by "rolling" radar antenna 110 onto its side (e.g. rotating it 90° to the left or right) and then sweeping radar antenna 110 through sweep range 123 at elevation angle 221 (simulating a vertical sweep of radar antenna 110) as it transmits radar signals 220 and performing steps similar to those described and illustrated herein for determining a horizontal offset 123.

In particular embodiments, vehicle 100 does not necessarily have to drive in a substantially straight line. The orientation of vehicle 100, $\theta_T$, may be monitored with an inertial sensor or other suitable INS sensor. If vehicle 100 is moving forward at a speed of $v_0$ meters per second while its orientation is monitored and radar antenna 110 is properly calibrated in elevation, then the radial-velocity component $v_r$ of a location 230 relative to radar antenna 110 for sweep angle $\theta_i$ corresponding to that location 230 and for elevation angle φ may be calculated as follows:

$$v_r(\theta_i, \theta_T, \phi) = v_0 \cos(\phi)\cos(\theta_i + \theta_T)$$

$$v_r(\theta_i, \theta_T, \phi) = v_0 \cos(\phi)[\cos(\theta_i)\cos(\theta_T) + \sin(\theta_i)\sin(\theta_T)]$$

In this example, the known orientation of the vehicle $\theta_T$ may be subtracted from the measurements to find the characteristic curve with respect to azimuth.

After an offset 123 (if any) between the expected electrical boresight and the actual electrical boresight of radar antenna 110 is determined, radar antenna 110 may then be calibrated. Radar antenna 110 may be moved or its orientation otherwise changed to reduce or eliminate offset 123. For example, if offset 123 is 5° to the right, then radar antenna 110 may be reoriented to move its actual electrical boresight moves 5° to the left. In addition or as an alternative, all or some of offset 123 may be corrected for or otherwise taken into account in calculations performed based on measurements by radar antenna 110. For example, if offset 123 is 5° to the right, then the radar system of vehicle 110 may adjust 5° to the left measurements by radar antenna 110 when performing calculations based on those measurements. Although this disclosure describes and illustrates particular steps for calibrating a radar antenna 110 after determining an offset 123, this disclosure contemplates any suitable steps for calibrating radar antenna 110 after determining offset 123. In particular embodiments (e.g. when the radar antenna 110 is part of a radar system of an autonomous vehicle), this calibration of radar antenna 110 may be initiated and completed entirely in the field, automatically and without user input. This may include transmitting radar signals 220 through a sweep range 223, calculating radial-velocity components for radar signals 220 reflected back to radar antenna 110, identifying a maximum radial-velocity component (or a zero radial-velocity component as described below with reference to FIGS. 6 and 7) and its corresponding sweep angle, calculating an offset 123 (if any) based on the maximum radial-velocity components (or zero radial-velocity component), and calibrating radar antenna 110 based on offset 123, entirely in the field, automatically and without user input.

FIG. 4 illustrates an example characteristic curve of radial velocities observed through a sweep range 223 by a radar antenna 110 on a vehicle 100 in the system of FIGS. 2 and 3. In the example of FIG. 4, the maximum observed radial velocity occurs at point 411, which corresponds to a sweep angle θ of 0° from a central longitudinal 240 axis of vehicle 100. This indicates that the actual electrical boresight of radar antenna 110 is horizontally aligned with central longitudinal axis 240 of vehicle 100. If the electrical boresight of radar antenna 110 expected by the radar system of vehicle 100 is also 0° from central longitudinal 240 axis of vehicle 100, then this also indicates that radar antenna 110 is properly horizontally calibrated.

FIG. 5 illustrates another example characteristic curve of radial velocities observed through a sweep range 223 by a radar antenna 110 on a vehicle 100 in the system of FIGS. 2 and 3. In the example of FIG. 5, the maximum observed radial velocity occurs at point 511, which corresponds to a sweep angle θ of approximately +10° from a central longitudinal axis 240 of vehicle 100. This indicates that the actual electrical boresight of radar antenna 110 is offset from central longitudinal axis 240 of vehicle 100 by +10°. If the electrical boresight of radar antenna 110 expected by the radar system of vehicle 100 is 0° from central longitudinal 240 axis of vehicle 100, then this also indicates that radar antenna 110 is not properly horizontally calibrated and the radar system should take into account an offset 123 of +10° when, e.g., calculating the location of an object based on measurements by radar antenna 110. In particular embodiments, this may be accomplished by subtracting 10° from the horizontal bearing of a measurement by radar antenna 110.

FIG. 6 illustrates an example system for calibrating a radar antenna on a vehicle using a rotating sphere. This system uses a rotating sphere 620, instead of the ground or other surface that vehicle 100 is driving on, as the reflective surface. Sphere 620 may have a diameter of one to three feet. Although sphere 620 is described and illustrated as having particular dimensions, this disclosure contemplates sphere 620 having any suitable dimensions. In the example of FIG. 6, to calibrate radar antenna 110, sphere 620 is placed in front of radar antenna 110 at a suitable distance (e.g. 20 feet), with the center of sphere 620 aligned with the expected electrical boresight of radar antenna 110. The distance between radar antenna 110 and sphere 620 may depend on the bearing resolution of radar antenna 110. As an example and not by way of limitation, a distance of 20 feet may be suitable if radar antenna 110 has a bearing resolution of less than 2° horizontally and vertically (i.e. with respect to azimuth and elevation). With the center of sphere 620 vertically and horizontally aligned with the expected electrical boresight of radar antenna radar 110, sphere 620 is rotated at a substantially constant speed. In particular embodiments, sphere 620 may be rotated at a speed of 200, 500, or 1,000 revolutions per minute (RPM). This disclosure contemplates any suitable sphere 620 rotating at any suitable speed. Vehicle 100 remains stationary during this calibration process. As sphere 620 rotates, radar antenna 110 transmits radar signals 220 while sweeping horizontally across the front of sphere 620 through a sweep range 223. During this process, radar signals 220 are reflected back to radar antenna 110 from locations 621 on sphere 620. Doppler shifts in radar signals 220 reflected back to radar antenna 110 from locations 621 may be measured by the radar system of vehicle 100 to determine the radial-velocity component of each location 621 relative to radar antenna 110.

FIG. 7 illustrates a top-down view of the example calibration system of FIG. 6. In the example of FIG. 7, sweep range 223 extends from location 621A to location 621I across the front of sphere 620. When the sweep angle is at the extreme positions (e.g. location 621A or 621I), the radial-velocity component observed by radar antenna 110 will be at a maximum (either positive or negative). If the actual electrical boresight of radar antenna 110 is horizontally aligned with the center of sphere 620 (which is horizontally aligned with the expected electrical boresight of radar antenna 110), then the radial-velocity component observed by radar antenna 110 will be zero at a sweep angle of 0°, indicating that radar antenna 110 is properly calibrated. However, if the actual electrical boresight of radar antenna 110 is not horizontally aligned with the center of sphere 620, then the radial-velocity component observed by radar antenna 110 will be at zero at a sweep angle other than 0°, indicating that radar antenna 110 is not properly calibrated. The sweep angle with a radial-velocity component of zero, as observed by radar antenna 110, may be determined by plotting the radial-velocity components observed by radar antenna 110 through sweep range 223, which may in turn indicate the offset between the expected electrical boresight and the actual electrical boresight of radar antenna 110.

As an example and not by way of limitation, sphere 620 may spin counter-clockwise at a fixed speed and radar antenna 110 may sweep from left to right (e.g. it may start at location 621A and sweep toward location 621I). At the leftmost location on sphere 620 (e.g. location 621A), the tangential velocity of the surface of sphere 620 may point substantially toward radar antenna 110 and the radar signal 220 reflected back to radar antenna 110 may, due to the Doppler effect, have a frequency that is a positive maximum of all radar signals 220 reflected back to radar antenna 110 from sphere 620. The surface of sphere 620 at location 621A is traveling directly toward radar antenna 110, and the Doppler shift caused by the tangential velocity of the surface of sphere 620 will cause the frequency of the radar signal 220 reflected back to radar antenna 110 from location 621A to be higher than from all other locations 621 on sphere 620. As radar antenna 110 sweeps horizontally across the front of sphere 620, starting at location 621A and proceeding toward location 621I, the tangential velocity pointing toward radar antenna 110 will decrease, which will cause the Doppler shift, and the frequency of the radar signals 220 reflected back to radar antenna 110, to decrease. At the center of sphere 620 (e.g. location 621E), the tangential velocity of the surface of sphere 620 will be perpendicular to the actual electrical boresight of radar antenna 110 (if radar antenna 110 is properly horizontally calibrated), and no Doppler shift will be observed at that location. As radar antenna 110 sweeps past the center of sphere 620, onto the side of sphere 620 that is spinning away from radar antenna 110 (at locations 621E-621I), the Doppler shift may decrease the frequency of radar signals 220 reflected back to radar antenna 110. The radar system of vehicle 100 may determine the sweep angle with no observed Doppler shift and thus determine the horizontal component of the actual electrical boresight of radar antenna 110.

Once the horizontal component of the actual electrical boresight is determined, it may be desirable to determine the vertical component the actual electrical boresight. As described above, this may be done by rotating the radar antenna 90° and applying the same procedures as discussed herein. With the radar antenna 110 rotated 90°, the elevation angle φ is the angle that changes instead of the sweep angle θ. This way, if the system uses the first calibration method, the vehicle can still drive in an open area and use the driving surface as the reflective surface. If the system uses the second calibration method, the radar antenna may still use a sphere that is spinning horizontally (e.g. counter-clockwise) instead of vertically.

Figure 8:
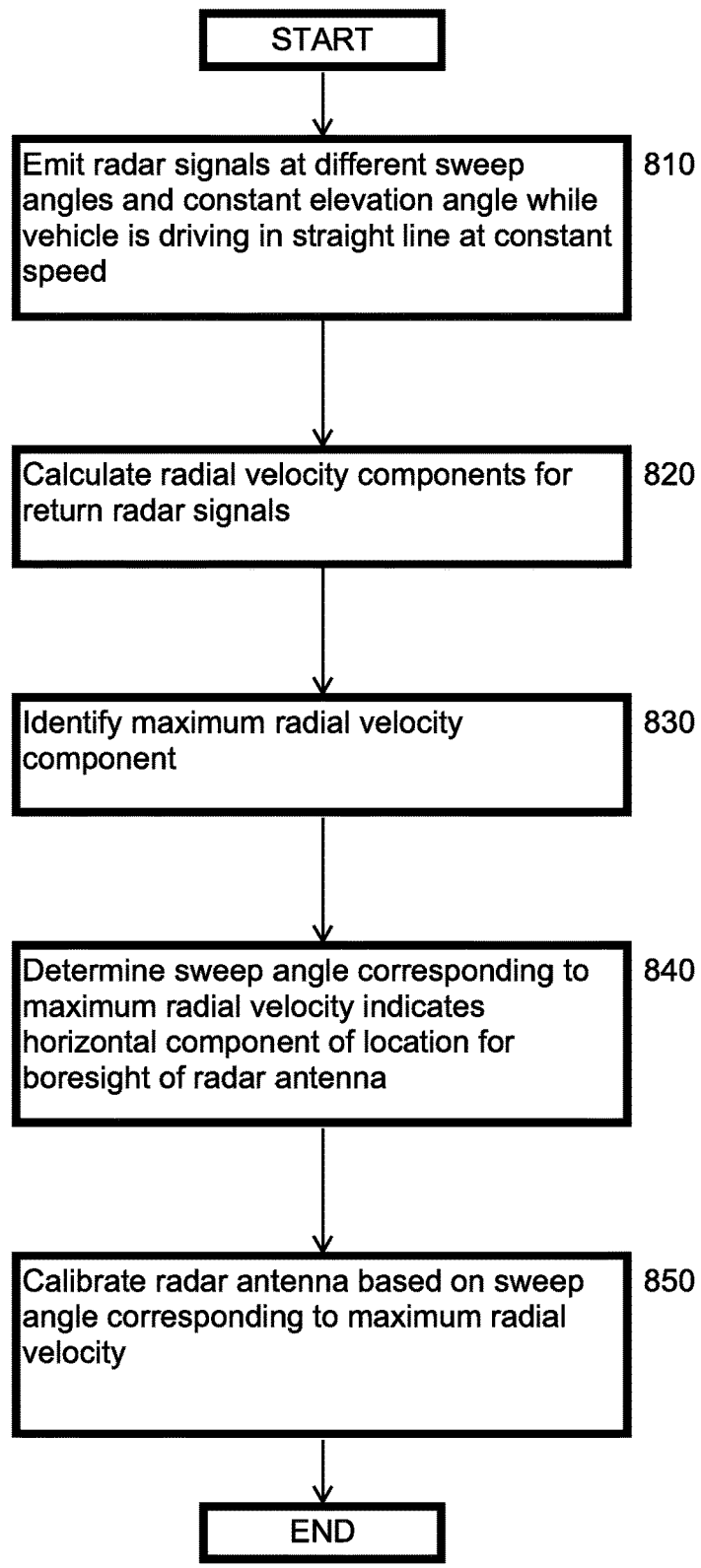
FIG. 8 illustrates an example method for calibrating a radar antenna on a vehicle.

FIG. 8 illustrates an example method 800 for calibrating a radar antenna 110 on a vehicle 100 (which may be an autonomous vehicle). The method may begin at step 810, where a computer system on board or otherwise associated with vehicle 100 (and may be remote from vehicle 100) causes radar antenna 110 on vehicle 100 to transmit multiple radar signals at multiple different sweep angles $\theta_i$ and at a substantially constant elevation angle $\phi_0$ while vehicle 100 is driving in a substantially straight line at a substantially constant velocity $v_0$. At step 820, after return radar signals are received at radar antenna 110, the computer system calculates multiple radial velocity components $v_r$ for the return radar signals. At step 830, the computer system identifies a maximum radial velocity component of the radial velocity components. At step 840, the computer system determines that the sweep angle $\theta_i$ corresponding to the maximum radial velocity component indicates a horizontal component of the actual electrical boresight of the radar antenna. At step 850, the computer system causes radar antenna 110 to be calibrated based on the sweep angle $\theta_i$ corresponding to the maximum radial velocity component, which in particular embodiments may be carried out autonomously by radar antenna 110, possibly facilitated by other devices on vehicle 110, at which point the method ends. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for calibrating a radar antenna 110 on a vehicle 100 as including the particular steps of the method of FIG. 8, this disclosure contemplates any suitable method for calibrating a radar antenna 110 on a vehicle 100 as including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
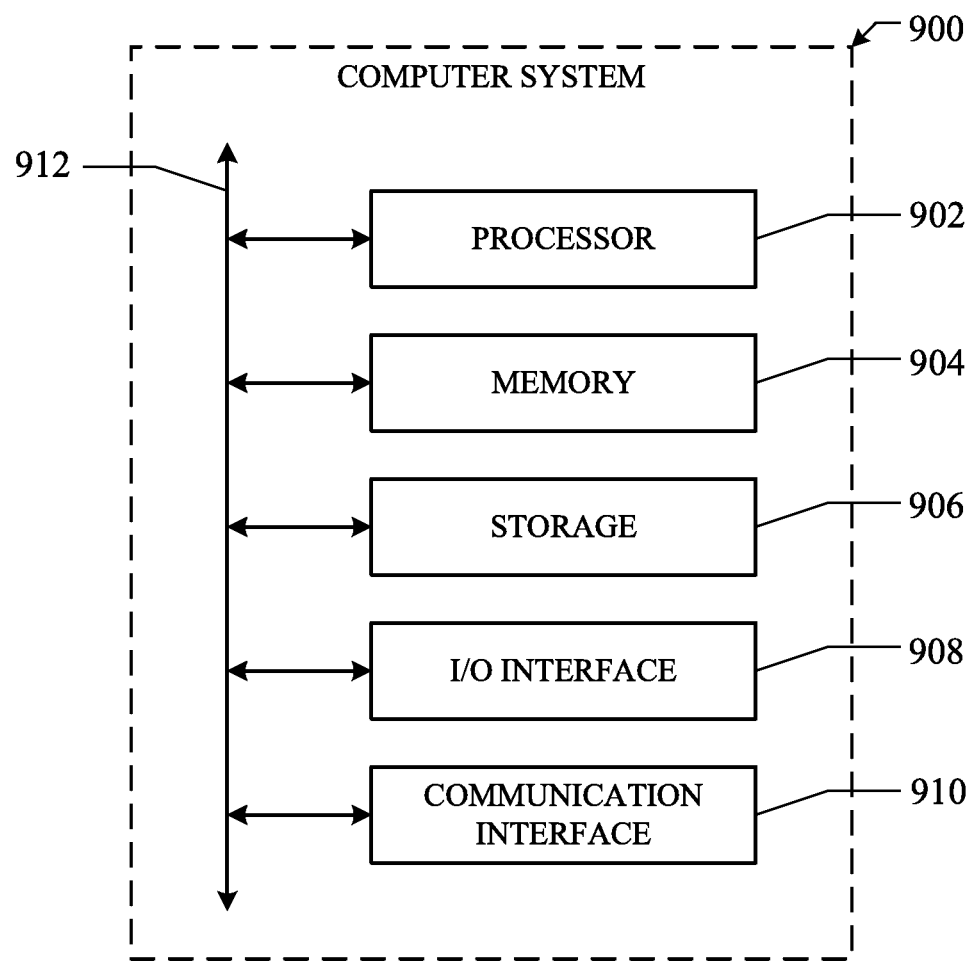
FIG. 9 illustrates an example computing system.

FIG. 9 illustrates an example computer system 900. In particular embodiments, one or more computer systems 900 perform one or more steps of one or more methods described or illustrated herein. In particular embodiments, one or more computer systems 900 provide the functionalities described or illustrated herein. In particular embodiments, software running on one or more computer systems 900 performs one or more steps of one or more methods described or illustrated herein or provides the functionalities described or illustrated herein. Particular embodiments include one or more portions of one or more computer systems 900. Herein, a reference to a computer system may encompass a computing device, and vice versa, where appropriate. Moreover, a reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 that are to be operated on by computer instructions; the results of previous instructions executed by processor 902 that are accessible to subsequent instructions or for writing to memory 904 or storage 906; or any other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs), be a multi-core processor, or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described in further detail below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising, by a computing device:
   causing a radar antenna to transmit radar signals at a plurality of sweep angles;
   calculating a respective value of a radial-velocity component corresponding to one or more reflected radar signals of the transmitted radar signals reflected back to the radar antenna;
   identifying one or more of the one or more radial-velocity components based on the one or more respective values of the one or more radial-velocity components;
   identifying a sweep angle of the plurality of sweep angles corresponding to the one or more identified radial-velocity components;
   calculating an offset between an actual electrical boresight of the radar antenna based at least in part on the identified sweep angle corresponding to the one or more identified radial-velocity components and an expected electrical boresight of the radar antenna; and
   causing the radar antenna to be calibrated based on the calculated offset.

2. The method of claim 1, wherein causing the radar antenna to be calibrated comprises causing the calculated offset to be accounted for in future measurements by the radar antenna.

3. The method of claim 1, wherein causing the radar antenna to be calibrated comprises causing an orientation of the radar antenna to be changed based at least in part on the calculated offset.

4. The method of claim 1, wherein:
   the radar antenna transmits the radar signals in one or more horizontal sweeps; and
   the calculated offset of the actual electrical boresight of the radar antenna is horizontal.

5. The method of claim 1, wherein:
   the radar antenna transmits the radar signals in one or more vertical sweeps; and
   the calculated offset of the actual electrical boresight of the radar antenna is vertical.

6. The method of claim 1, wherein the reflected radar signals are reflected from a plurality of locations on a substantially planar surface moving at a substantially constant velocity relative to the radar antenna.

7. The method of claim 1, wherein the reflected radar signals are reflected from a plurality of locations on a surface of a sphere rotating at a constant speed in front of the radar antenna.

8. The method of claim 1, wherein the radar antenna is located in or on a vehicle.

9. The method of claim 8, wherein the vehicle is an autonomous vehicle.

10. The method of claim 8, wherein the radar antenna is located:
    on top of the vehicle; or
    on or in a bumper of the vehicle.

11. A system comprising: one or more processors; and one or more computer-readable non-transitory storage media in communication with the one or more processors, the one or more computer-readable non-transitory storage media comprising instructions that, when executed by the one or more processors, are configured to cause the system to perform operations comprising:
    causing a radar antenna to transmit radar signals at a plurality of sweep angles;
    calculating a respective value of a radial-velocity component corresponding to one or more reflected radar signals of the transmitted radar signals reflected back to the radar antenna;
    identifying one or more of the one or more radial-velocity components based on the one or more respective values of the one or more radial-velocity components;
    identifying a sweep angle of the plurality of sweep angles corresponding to the one or more identified radial-velocity components;
    calculating an offset between an actual electrical boresight of the radar antenna based at least in part on the identified sweep angle corresponding to the one or more identified radial-velocity components and an expected electrical boresight of the radar antenna; and
    causing the radar antenna to be calibrated based on the calculated offset.

12. The system of claim 11, wherein causing the radar antenna to be calibrated comprises causing the calculated offset to be accounted for in future measurements by the radar antenna.

13. The system of claim 11, wherein causing the radar antenna to be calibrated comprises causing an orientation of the radar antenna to be changed based at least in part on the calculated offset.

14. The system of claim 11, wherein:
    the radar antenna transmits the radar signals in one or more horizontal sweeps; and
    the calculated offset of the actual electrical boresight of the radar antenna is horizontal.

15. The system of claim 11, wherein:
    the radar antenna transmits the radar signals in one or more vertical sweeps; and
    the calculated offset of the actual electrical boresight of the radar antenna is vertical.

16. The system of claim 11, wherein the reflected radar signals are reflected from a plurality of locations on a substantially planar surface moving at a substantially constant velocity relative to the radar antenna.

17. One or more computer-readable non-transitory storage media including instructions that, when executed by one or more processors of a computing system, are configured to cause the one or more processors to perform operations comprising:
    causing a radar antenna to transmit radar signals at a plurality of sweep angles;
    calculating a respective value of a radial-velocity component corresponding to one or more reflected radar signals of the transmitted radar signals reflected back to the radar antenna;
    identifying one or more of the one or more radial-velocity components based on the one or more respective values of the one or more radial-velocity components;

identifying a sweep angle of the plurality of sweep angles corresponding to the one or more identified radial-velocity components;

calculating an offset between an actual electrical boresight of the radar antenna based at least in part on the identified sweep angle corresponding to the one or more identified radial-velocity components and an expected electrical boresight of the radar antenna; and causing the radar antenna to be calibrated based on the calculated offset.

18. The one or more computer-readable non-transitory storage media claim 17, wherein the reflected radar signals are reflected from a plurality of locations on a substantially planar surface moving at a substantially constant velocity relative to the radar antenna.

19. The one or more computer-readable non-transitory storage media claim 17, wherein the reflected radar signals are reflected from a plurality of locations on a surface of a sphere rotating at a constant speed in front of the radar antenna.

20. The method of claim 8, wherein the calculated offset corresponds to the actual electrical boresight of the radar antenna being misaligned with a central longitudinal axis of the vehicle.

21. The method of claim 1, wherein the actual electrical boresight of the radar antenna corresponds to an axis of maximum radiated power of the radar antenna.

22. The method of claim 1, wherein one of the one or more identified radial-velocity components is a maximum radial-velocity component.

23. The method of claim 1, wherein identifying the sweep angle of the plurality of sweep angles corresponding to the one or more identified radial-velocity components comprises calculating a sweep angle based on the one or more identified radial-velocity components.

* * * * *